United States Patent

[11] 3,622,744

| [72] | Inventors | David C. Main<br>North Stonington;<br>Petros T. Petrides, Norwich; Rodney R. Cordeiro, Stonington; Charles L. Gordon, East Lyme, all of Conn. |
|---|---|---|
| [21] | Appl. No. | 789,182 |
| [22] | Filed | Jan. 6, 1969 |
| [45] | Patented | Nov. 23, 1971 |
| [73] | Assignee | General Dynamics Corporation<br>New York, N.Y. |

[54] ARC-WELDING SYSTEM
11 Claims, 3 Drawing Figs.

[52] U.S. Cl. .................................................. 219/131 R, 219/137
[51] Int. Cl. ................................................. D23k 9/10
[50] Field of Search .......................................... 219/137, 131, 135, 110; 329/71, 72, 73, 74

[56] References Cited
UNITED STATES PATENTS

| 3,071,680 | 1/1963 | Anderson et al. | 219/131 R |
| 3,317,811 | 5/1967 | Normando et al. | 219/131 R X |
| 3,361,892 | 1/1968 | Spencer | 219/131 |
| 3,371,242 | 2/1968 | Aldenhoff et al. | 219/135 X |
| 3,387,112 | 6/1968 | Guettel | 328/72 X |
| 3,436,514 | 4/1969 | Broomhall et al. | 219/131 X |
| 3,449,543 | 6/1969 | Sciaky | 219/131 |

Primary Examiner—J. V. Truhe
Assistant Examiner—George A. Montanye
Attorney—William C. Everett ABSTRACT: A saturable reactor welding power supply is controlled by a closed loop control system so as to provide arc current which surges periodically between manually selectable predetermined low-current and high-current values. The current is maintained at the high-current value and the low-current value for predetermined times. Switching logic automatically starts the arc at a proper preselected current and automatically decreases the arc current, finally shutting off the supply when a control switch is actuated.

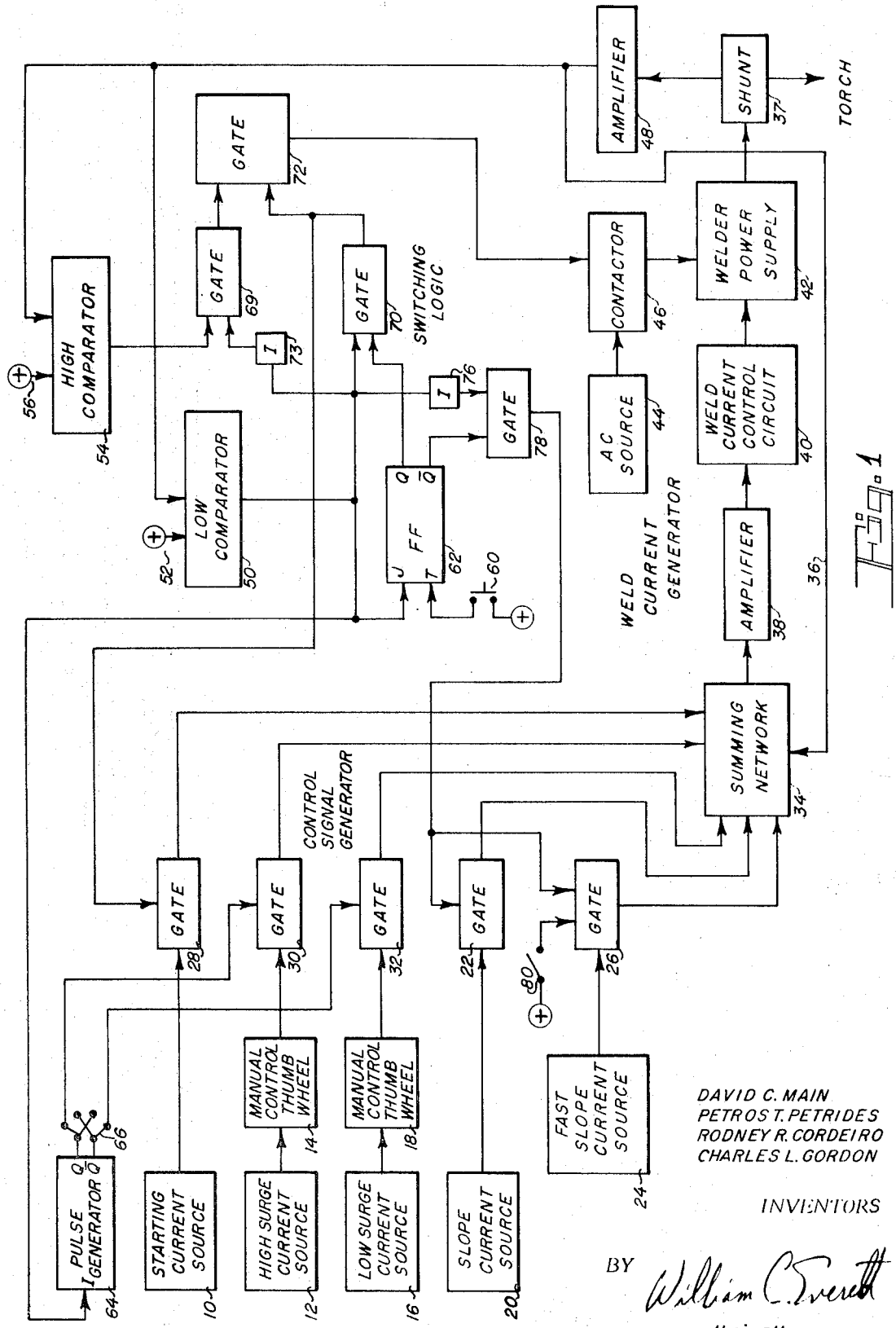

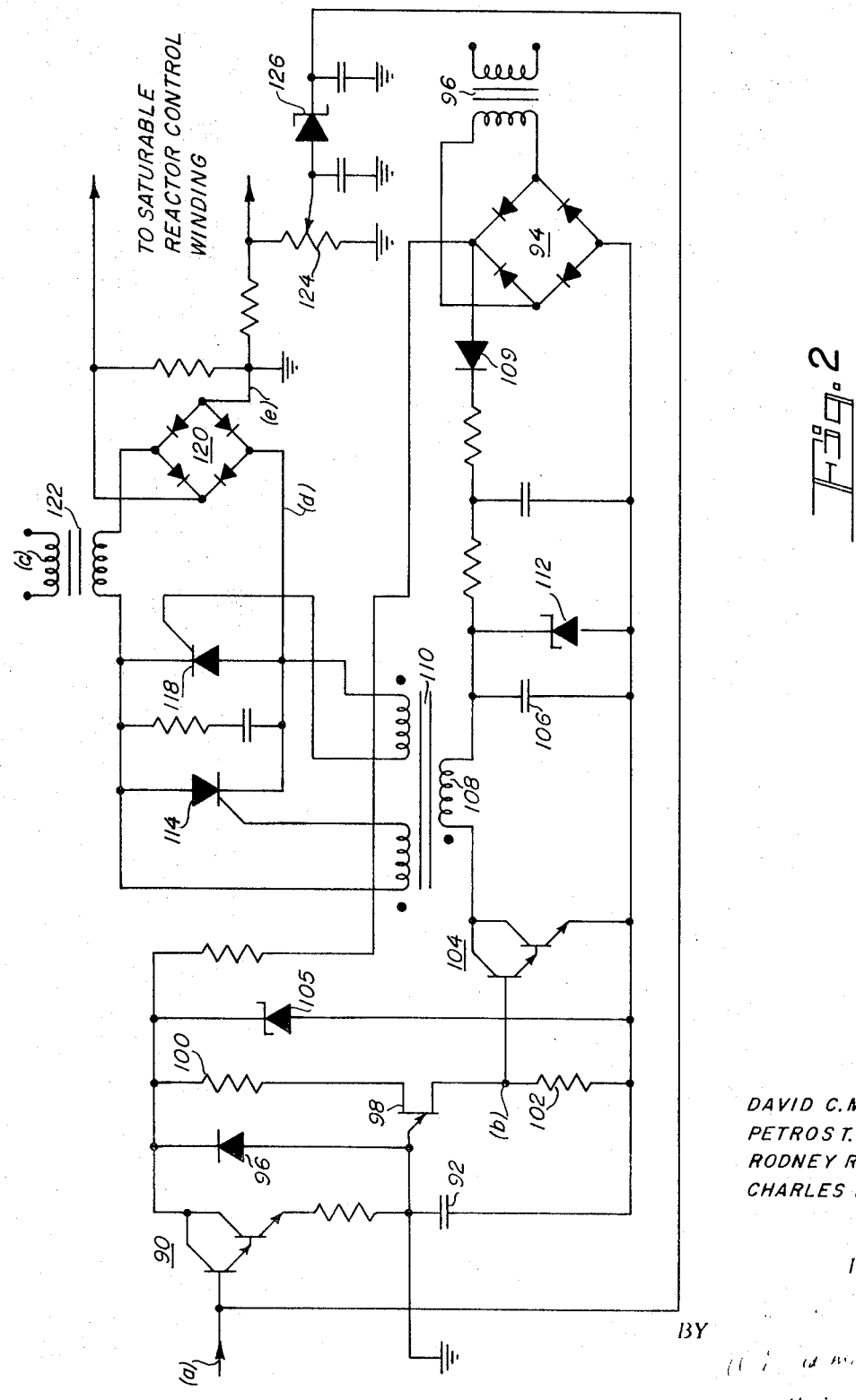

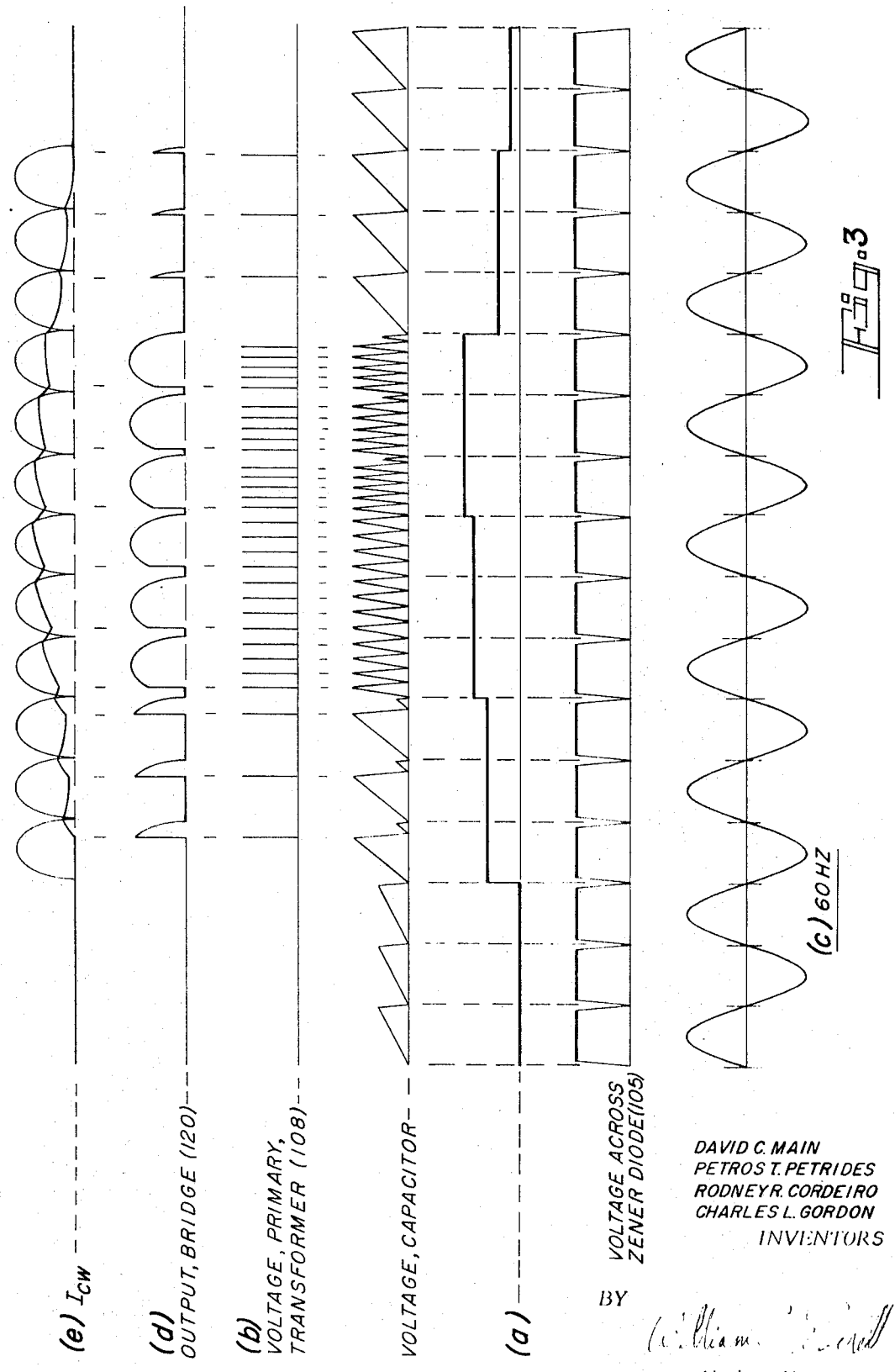

ARC-WELDING SYSTEM

The present invention relates to methods and apparatus for arc welding and particularly to a system for supplying welding current to an arc-welding torch.

The invention is suitable for use in arc welding systems of the TIG and MMA types, as well as to TIG arc welding where a filler material, such as an insert is provided in the weld joint.

Fusion of filler material, such as consumable inserts, in the course of arc welding has heretofore been accomplished only with difficulty. The consumable material has a tendency to flow out of the joint area. Even when flow restrictive backing members are used to reduce the flow, the resulting welds are usually unacceptable because of the rough surface formed in the region of the flow restrictive member. In addition, such joint geometries as a "U" have been required. These geometries are uneconomical in that they require larger amounts of consumable material, increasing the cost of the welding process because of the increased cost of material and the longer welding time which is necessary for fusion of the larger amount of material. Increased arc currents involved also make burn-through and damage to the material being welded more probable, thus requiring greater operator skill levels and again longer welding times.

It has been found in accordance with the invention that acceptable welds may be made by providing a surging arc current which provides the optimum characteristics of high amperage for satisfactory fusion followed by a retreat to lower amperage and lower arc current for preheating and the prevention of burn-through.

Briefly described, the method provided by the invention may be practiced by producing a welding current which surges periodically between selectable high-current and low-current values. The dwell time or the duration of the high amplitude current period and the low amplitude current period may be adjusted to provide optimum welding characteristics depending upon the material being welded and the welding mode (viz. TIG, TIG with filler, or MMA). The durations of the high amplitude current dwell time and the low amplitude current dwell time may be reversed in order to provide the selected welding mode. The amplitude of the high and low amplitude welding currents may be adjusted manually, depending upon such factors as the thickness of the joint and susceptibility to burn-through.

Briefly described, arc welding apparatus embodying the invention may include a plurality of current sources, two of which provide control signals having amplitudes corresponding to the high and low-current values respectively. Another source may provide a control signal which decays or slopes at a selected rate. Switching logic selectively applies the control signals and a current feedback signal, which is a function of the arc current, to a circuit which generates an error signal. The welding current may be generated by a controllable power supply, such as may include a saturable reactor. A control circuit operated by the error signal controls the welding supply to provide arc current which surges from low to high current values during the welding cycle and, upon command, slopes to a low-current value for safe cut-off of the arc.

It is therefore an object of the invention to provide an improved method of and system for arc welding which provides optimum welding current characteristics during the welding cycle.

It is a further object of the present invention to provide an improved arc welding system which provides welding current having characteristics necessary to satisfy selected modes of welding, such as TIG, MMA and TIG fill.

It is a still further object of the present invention to provide an improved arc-welding method and system which provides high amperage current for melting followed by low amperage current for preheating, thereby producing better weldments with less probability of burn-through damage.

It is a further object of the present invention to provide an improved arc-welding system which furnishes precisely controlled arc current.

It is a still further object of the present invention to provide an improved arc-welding system which automatically starts at proper preselected current and then automatically shuts off the arc upon command, automatically delaying cutoff until the arc current is below a preset value at which the welding arc may be extinguished without damage to the weldments.

It is a still further object of the present invention to provide an improved arc-welding system which automatically extinguishes the welding arc when a preset overcurrent occurs, thereby protecting the welding apparatus and the work from overcurrent damage.

The invention itself, both as to its organization and method of operation, as well as additional objects and advantages thereof will become more readily apparent from a reading of the following description in connection with the accompanying drawings in which:

FIG. 1 is a simplified block diagram of a welding system embodying the invention;

FIG. 2 is a schematic diagram of the weld current control circuit shown in FIG. 1; and FIG. 3 shows waveforms explanatory of the operation of the system shown in FIG. 1 and the circuit shown in FIG. 2.

Referring first to FIG. 1, there is shown a control signal generator made up of a plurality of current sources. A first of these sources 10 provides a preset current for starting the arc. Another current source 12 provides a high amplitude current which is used to generate a control signal to cause the arc current to surge to a predetermined high value which is selectable by means of manually controllable thumbwheel switches 14. Another current source 16 provides a lower current amplitude which may be adjusted by manually controllable thumbwheel switches 18 to provide a surge to a low current value. Still another current source 20 provides a current which decreases or slopes at a selected rate and is therefore referred to as a slope current source. This slope current source may contain a capacitor which charges or discharges at a predetermined rate when a control signal necessary to decrease or slope out the welding current is desired. The discharge or charge of the capacitor to provide the slope signal may be triggered by the operation of a gate 22 which is associated with the slope current source 20. In other words, the gate 22 may be a switching circuit such as a transistor which is connected to the capacitor in the current source 20 to initiate the slope.

A decreasing current at a faster rate or a fast slope is provided by a fast slope current source 24. The source 24 may include a diode in its output which permits a flow of current through a gate 26 associated with the source 24 in a proper direction to generate a decreasing step voltage which provides the control signal for reducing the welding current at a fast rate.

In addition to the gates 22 and 26, a gate 28 is associated with the starting current source and gates 30 and 32 are associated with the high and low surge current sources 12 and 16, respectively. The output of these gates, when enabled, are applied to a summing network 34 which generates an input or error signal for controlling the arc current. The summing network also receives a feedback signal on a feedback line 36 which is proportional to the arc current so that the welding system operates in a closed loop mode.

The error signal from the summing network is applied to control a weld current generator. The error signal may be amplified in a DC amplifier 38 before being applied to a weld current control circuit 40 which generates a control current of amplitude and duration corresponding to the error signal resulting from the control signal generator outputs and the arc current feedback signal. A welder power supply 42 provides an output current which is proportional to the control current generated by the control circuit 40. A saturable reactor control circuit may be included in the welder power supply. The control current from the control circuit 40 is applied to the control winding of the saturable reactor to obtain the requisite control function.

Power, such as three phase AC power from an alternating current source 44 such as the power line, is applied by way of a contactor 46 which may be an electromagnetically controlled switch to the power supply 42. The welding current from the power supply is supplied to the torch via a low resistance shunt 37 which derives the feedback signal. The feedback signal may be applied to the summing network 34 via a buffer amplifier 48. The feedback signal is also applied to a comparator circuit 50 indicated as being a low comparator to which a reference voltage is also applied at an input terminal 52 thereof. The comparator may be a threshold-type amplifier which provides two output levels, one which will be referred to herein as an enabling level (logical "1") when the feedback voltage is lower than a preset value, and the other an inhibiting level (logical "0") when the feedback voltage is higher than the preset level. The enabling level is therefore produced before the arc is formed and before the arc current reaches a certain low value, such as 20 amperes.

Another comparator 54 indicated as being a high comparator may be a circuit similar to the circuit of the low comparator 50. The high comparator also has a reference voltage applied at an input terminal 56 thereof. This voltage is preset so that the high comparator produces an enabling output (logical "1") until the arc current reaches the preset high value and produces an inhibiting output (logical "0") after that value is exceeded. In flip-flop the high comparator functions as an overcurrent detector.

The low comparator 50 and the high comparator 54 are part of the switching logic for the welding system. The switching logic is controlled by means of a switch 60 which may be a start and stop push button (preferably foot operated). This button 60 applies a level when depressed to the trigger or toggle input of a flip-flop 62. The flip-flop may be of the type which toggles in one direction (viz. from one state to an opposite state or set to reset) depending upon the logical value of the level applied to an input thereof. This input is indicated as the J input of the flip-flop. The flip- flop also provides complementary outputs at output terminals indicated as Q and $\bar{Q}$.

Other circuits in the switching logic include a pulse generator 64. This may be a variable rate pulse generator provided by a pair of one-shot multivibrators, one of which is connected to trigger the other so as to be free running. These multivibrators may be integrated circuits which include gates for inhibiting the operation thereof when an enabling output (logical "1") is applied to an inhibit "0" input thereof so that no pulses are provided at their complementary outputs which are indicated as Q and $\bar{Q}$. In operation, the pulse generator will produce a high level (logical "1") and low level (logical "0") output alternatively on its Q and $\bar{Q}$ outputs. When the pulse generator is inhibited, the Q output is a "0."

The Q and $\bar{Q}$ outputs of the pulse generator are applied to the gates 30 and 32 associated with the high surge source and the low surge source 12 and 16 through a reversing switch 66. The pulse generator may provide during a first portion of a pulse period logical "1" and "0," Q and $\bar{Q}$ outputs, having a certain duration, say 0.3 second, followed by a "0" Q output and a "1" $\bar{Q}$ output for the remainder of the pulse period which, for example, may be 0.2 second. The repetition rate therefore in this case would be two pulses per second. Accordingly, when the pulse generator is enabled, either the gate 30 or the gate 32 will be enabled during the first or 0.3 second portion of the pulse period. The other gate will be enabled during the remainder or 0.2 second portion of the pulse period. In the last mentioned case, a high surge current control signal will be followed by a low surge current control signal, the former having a duration or dwell time of 0.3 second and the latter a duration or dwell time of 0.2 second.

By means of a reversing switch 66, the dwell time of the high surge and the low surge may readily be reversed. In TIG welding, it is desirable to have a longer low surge dwell time and a shorter high surge dwell time, while in the MMA mode of welding a longer high surge dwell time is desirably followed by a shorter low surge dwell time. The reversing switch 66 accomplishes this purpose. In TIG fill welding, it is desirable to provide a longer high surge dwell time than is provided either in TIG or MMA welding. In order to provide such a longer high surge dwell time, the high and low dwell times are reversed by means of a TIG fill switch on the console, such as high dwell 0.3 second and low dwell 0.2 second.

The output of the low comparator 50 is applied to the inhibit input of the pulse generator so as to inhibit the pulse generator until the low comparator produces an inhibit, or logical "0," output (i.e., when the feedback voltage is greater than the reference applied to the terminal 52, thereby indicating the arc current is above the preset low magnitude.). The enable, or "1" level, when applied to the J input of the flip-flop 62, permits it to be toggled to its set condition (i.e., the condition where its Q output is "1" and its $\bar{Q}$ output is "0"). Thus, when the welder power supply 42 is inoperative and cut off and the switch 60 is depressed, the flip-flop 62 will be toggled to its set state.

The low comparator enabling output also enables a gate 70. When this gate 70 is enabled, it enables the gate 28 which applies the starting current control signal from the source 10 to the summing network 34. The welder is then conditioned to generate the preset starting current.

The output of the gate 70 is also applied to an OR-gate 72 (all of the other gates mentioned herein being AND gates) together with the output of gate 69, which is controlled by the output of the high comparator 54. Since at this point in the cycle there is no welding current, the low comparator 50 produces an enabling output, permitting gate 70 to be enabled and thus permitting the gate 72 to be enabled. The gate 72, when enabled, produces a command which causes the contactor 46 to pull in. Inasmuch as the level at the output of the gate 72 may not be sufficient to generate the requisite pull in current, it may be desirable to utilize a light dependent resistor, including a lamp which is illuminated when the gate 72 is enabled. The light dependent resistor then triggers a silicon controlled rectifier which permits the flow of current to the contactor operating winding. With the welding power supply operative, and the starting current control signal applied to the weld current control circuit 40, the arc is initiated and the welding current increases.

When the level of the welding current reaches 20 amperes, the low comparator 50 produces an inhibit output. This output is taken by the inhibit input of the pulse generator 64 as an enabling level. Therefore the pulse generator begins to produce pulses, causing the high and low surge control signals to be applied to the weld current control circuit 40, and thence to the welder power supply, thereby causing welding current to surge from high to low level for the dwell time selected by the reversing switch 66.

The inhibit level at the output of the low comparator also inhibits the gate 70, thereby in turn inhibiting the gate 28 to shut off the starting current control signal as soon as the low comparator's reference level (20 amperes) is exceeded.

The inhibit level from the low comparator 50 also latches the contactor through gate 72 during the welding cycle. This is accomplished by applying the inhibit level via an inverter 73 and a gate 69 which is enabled by the high comparator 54 to the OR-gate 72. The gate 72 therefore remains enabled during the welding cycle.

If an overcurrent is detected, however, the high comparator 54 produces an inhibit level which inhibits the gate 69, thereby causing gate 72 to be inhibited and the contactor 46 to drop out, cutting off the welding current.

When the inhibit level appears at the J input of the flip-flop 62, the flip-flop is conditioned to be toggled to its opposite reset state. When the welding cycle is to be stopped, the operator depresses the switch 60, causing the flip-flop to be reset. The inhibit level from the low comparator is inverted in an inverter 76 and applied with the $\bar{Q}$ output of the flip-flop 62 to a gate 78. The gate 78 is then enabled, operating the gate 22, which applies the slope control current to the summing network 34. In the event that a fast slope is desired, a switch 80 is closed, thus adding the fast slope current to the slow slope current in the summing network. Fast slope is desired in certain welding modes, such as MMA. It will be noted that the gate 78 precludes the enabling of the gates 22 and 26 during the starting cycle, when an enabling level is produced by the low comparator 54. As soon as the low comparator again produces an enabling level in response to the decrease of welding current below the 20 amp preset threshold, the gate 72 will become inhibited, thereby permitting the contactor 46 to drop out, thus completing the welding cycle.

It may be desirable to reverse the polarity of the welding current. To this end, a reversing switch (not shown) may be provided at the output of the welder power supply.

FIG. 2 shows the weld current control circuit which provides the output current to the saturable reactor control winding of the welder power supply 42. The error or control signal from the amplifier is applied to an emitter follower circuit of the dual transistor-type 90. This circuit permits a capacitor 92 to be charged from a source of direct current voltage provided by a bridge rectifier 94 which rectifies alternating current supplied thereto from the AC line via a transformer 96. Inasmuch as the control signal applied to the base of the first transistor of the emitter follower path 90 determines the conductivity of that pair, the rate of charge will be a linear function of the control signal applied to the base of the first transistor of the pair 90. When the voltage across the capacitor 92 reaches the triggering potential of a unijunction transistor 98, this transistor fires and a pulse of current flows through its output circuit resistors 100 and 102.

The voltage pulse appearing across the resistor 102 triggers a pair of switching transistors 104 into conduction. These switching transistors 104 provide a discharge path for a capacitor 106 through the primary winding 108 of a pulse transformer 110. The capacitor 106 is charged from the rectifier 94 via a diode 109 which prevents discharge of the capacitor 106 back into the rectifier. A zener diode 112 is provided to regulate the voltage to which the capacitor 106 can charge. The capacitor 106 is much larger than the capacitor 92. Accordingly, it can develop a higher current, when discharge occurs through the pulse transformer 110, to provide a substantial current burst which will be sufficient to trigger a pair of silicon controlled rectifiers (SCR) 114 and 118 in the current control circuit for the saturable reactor control winding. The SCRs 114 and 118 are connected in series with a bridge rectifier 120 and the output winding of a transformer 122. The transformer 122 input winding is connected across the AC line.

The magnitude of the direct current which is generated by the circuit including the SCRs 114 and 118 and the rectifier 120 (i.e., the DC value thereof) is a function of the time in the alternating current cycle of the cycle of the 60 cycle voltage applied by way of the transformer 122 at which the SCRs 114 and 118 are triggered. Inasmuch as the triggering point depends upon the amplitude of the control voltage applied to the base of the first of the transistors 90, the control current for the saturable reactor control winding will be proportional to that control voltage.

In the interest of protecting the control winding, a portion of the control current is applied via a potentiometer 124 and a regulating circuit including a zener diode 126 to the base of the first of the pair of transistors 90. When the current to the control winding exceeds a safe value, the zener voltage is exceeded and limits the operating point of transistors 90 to a safe value. Thus the current to the control winding is limited.

Referring to FIG. 3, the control signal from the amplifier 38 which is applied to the base of the first of the pair of transistors 90, the surge arc welding cycle is illustrated in waveform (a). The rate at which the capacitor 92 is charged is a function of the amplitude of this control voltage.

Inasmuch as the discharge of the capacitor 92 through the control and output electrode of the uni-junction transistor 98 is approximately constant because it is controlled by the value of the resistor 102, the discharge time is approximately constant. However, as the voltage to the pair of transistors 90 increases, capacitor 92 charges in less time, thus it discharges more frequently in any given unit of time. Thus the effective frequency of the trigger pulses indicated in waveform (b) which are produced by the switching of the pair of switching transistors 104 is increased.

This increased frequency of trigger pulses allows the SCRs to be triggered at a higher frequency. Since an SCR can be triggered only once during a positive cycle, the increased frequency of trigger pulses effectively triggers the SCR earlier in the cycle. Thus the SCRs conduction time increases as the signal to the transistor 90 increases. Voltage regulating zener diode 105 limits the voltage across transistor 98 and resistors 100 and 102.

The alternating current which is rectified when the SCRs 114 and 118 are triggered occupies a greater portion of the alternating cycle during the high surge signal interval than during the low surge signal interval. Accordingly, the rectified outputs are shown in waveform (d) as a higher DC value. The current produced by the saturable reactor controlled welder power supply 42 therefore surges in accordance with the control signal provided by the high surge and low surge sources 12 and 16 (FIG. 1).

From the foregoing description, it will be apparent that there has been provided an improved arc-welding system and method of arc welding. The practice of this method and the use of this system is adapted to provide better weldments with the reduced possibility of damage due to burn-through and improper fusion of material, such as filler inserts, which may be placed in the joint to be welded. It will also be appreciated that the system as shown in the drawings and described in this specification has been simplified in the interest of clarity of exposition of the invention. Variations and modifications and refinements in the system as described herein, within the scope of the invention, will undoubtedly suggest themselves to those skilled in the art. Accordingly, the foregoing description should be taken as illustrative and not in any limiting sense.

We claim:

1. In an arc-welding apparatus of the type having an electrode, a workpiece, a welding current generating means, and means for providing an input signal to the generating means which establishes an arc welding current between the electrode and workpiece proportional to the amplitude of the input signal, the improvement comprising:
   a. a plurality of control signal source means each providing a control signal having a different amplitude characteristic,
   b. gating means for selecting one of the control signals from said source means, and generating an output corresponding thereto,
   c. means for operating said gating means for alternately selecting control signals from a first of said source means which provides a control signal of relatively high magnitude and a second of said source means which provides a control signal of lower magnitude,
   d. means for detecting the amplitude of the arc welding current and generating a signal proportional thereto, and
   e. means responsive to the difference between the output of the gating means and the output of the means for detecting, for providing the input signal.

2. The invention as set forth in claim 1 further comprising switching logic for operating said gating means, said switching logic including a pulse generator means for repetitively providing pulses including successive portions of high level and low level, and means for applying the pulses to said gating means for alternately selecting said first and second sources when the pulses have one of said levels.

3. The invention as set forth in claim 2 wherein said switching logic also includes a flip-flop having a pair of stable states, a first comparator means responsive to the difference between the signal proportional to the arc current and a first reference signal for providing an output which enables the toggling of said flip-flop to a first state when the arc current is below a predetermined amplitude, means operated by said flip-flop when conditioned in one of its states and in the opposite of its states for respectively rendering said welding current generating means operative and inoperative to generate welding current, and means for toggling said flip-flop to start and stop the welding cycle.

4. The invention as set forth in claim 3 including means responsive to the enabling output of said first comparator for inhibiting said flip-flop operated means.

5. The invention as set forth in claim 4 including means operated by the output of said first comparator for inhibiting said pulse generating means.

6. The invention as set forth in claim 5 wherein said plurality of control signal source means includes a third source means which provides a control signal which slopes from a high level to a low level sufficient to reduce the welding current towards cutoff when applied to said means for providing the input signal, means connecting the output of said flip-flop to said gating means for selecting the third source control signal when said flip-flop is in its opposite state so as to reduce the welding current and permit said flip-flop operated means to render said generating means inoperative after the welding current is reduced to the predetermined amplitude.

7. The invention as set forth in claim 6 including a fourth source means for providing a control signal which decreases at a greater rate than the third source control signal when applied to the means for providing the input signal and manual means for selecting the control signal of said fourth source means when said flip-flop is conditioned to its said opposite state.

8. The invention as set forth in claim 1 wherein each of said plurality of source means is a current source means, and including means for manually varying the amplitude of the current supplied from said first and second source means to provide the control signals from the first and second source means.

9. The invention as set forth in claim 2 wherein said welding current generating means includes a saturable reactor having a control winding, a welding current control circuit means responsive to said means for providing the input signal for supplying current to said control winding which is proportional in amplitude to the amplitude of the input signal and a power supply means including said reactor for converting AC into DC welding current having an amplitude dependent upon the amplitude of the current supplied to said control winding.

10. The invention as set forth in claim 9 wherein said welding current control circuit means comprises
  a. a first capacitor,
  b. current control means responsive to said means for providing the input signal for charging said first capacitor at a rate proportional to the amplitude of the input signal,
  c. a unijunction transistor,
  d. means coupling said unijunction transistor to said first capacitor for triggering said unijunction transistor to pass a current pulse therethrough when said capacitor becomes charged to a certain voltage,
  e. a second capacitor,
  f. means for applying a constant voltage across said second capacitor,
  g. a transformer having a primary winding and at least one secondary winding,
  h. means for discharging said second capacitor through said primary winding when said unijunction transistor passes the pulse,
  i. a rectifier connected in series with a source of alternating current having a frequency much higher than the frequency of the pulses provided by said pulse generator, and an SCR having a trigger electrode and two other electrodes connected in series with said rectifier and said source of alternating current, said rectifier also connected to supply current to said control winding, and
  j. means for connecting said secondary winding between the trigger electrode and one of the other electrodes of said SCR.

11. The invention as set forth in claim 3 including a second comparator means responsive to the difference between the output of said means for detecting and a second reference amplitude higher than the first reference amplitude for providing an output, said flip-flop operated means also being operated by the last named output for rendering said welding current generating means inoperative, whereby the welding current is cut off when it exceeds a safe magnitude.

* * * * *